United States Patent [19]
Fitzgerald

[11] 4,026,151
[45] May 31, 1977

[54] MEASURING DEVICE FOR WATER FLOW IN A BURIED PIPE

[76] Inventor: Joseph C. Fitzgerald, 439 Minorca Ave., Coral Gables, Fla. 33134

[22] Filed: May 10, 1976

[21] Appl. No.: 684,768

[52] U.S. Cl. .......................... 73/194 R; 33/126.6; 33/169 B; 73/290 R; 73/308
[51] Int. Cl.² .................... G01F 1/00; G01F 23/06
[58] Field of Search ............... 73/194 R, 198, 290, 73/291, 305, 306, 307, 308, 313; 33/126.5, 126.6, 169 B, 169 F

[56] References Cited
UNITED STATES PATENTS

| | | | |
|---|---|---|---|
| 2,324,698 | 7/1943 | Hart | 33/126.6 |
| 3,534,605 | 10/1970 | Koning et al. | 73/290 |

*Primary Examiner*—Herbert Goldstein

[57] ABSTRACT

A measuring device to determine the depth of sediment in the floor of a buried pipe and the rate of flow of water through the pipe. The device includes a first shaft with a sleeve telescoped on the shaft with the lower end of the shaft being adapted to engage the floor of the pipe and with the lower end of the sleeve being adapted to rest on the surface of sediment in the pipe so that the relative axial displacement of the sleeve in relation to the pipe will measure the depth of sediment in the floor and a float which is connected to the sleeve and includes a lift member for raising and lowering the float on a suspension means which is operably connected to a switch so that when tension on the suspension means is relaxed when the float is supported by the water instead of a suspension means, energy from a source flows through the switch and indicates the relaxation of the tension and on the float there is provided a member which is movable in response to the rate of water flow through the pipe and which is connected to an electrical circuit to indicate the rate of flow of water through the pipe.

9 Claims, 5 Drawing Figures

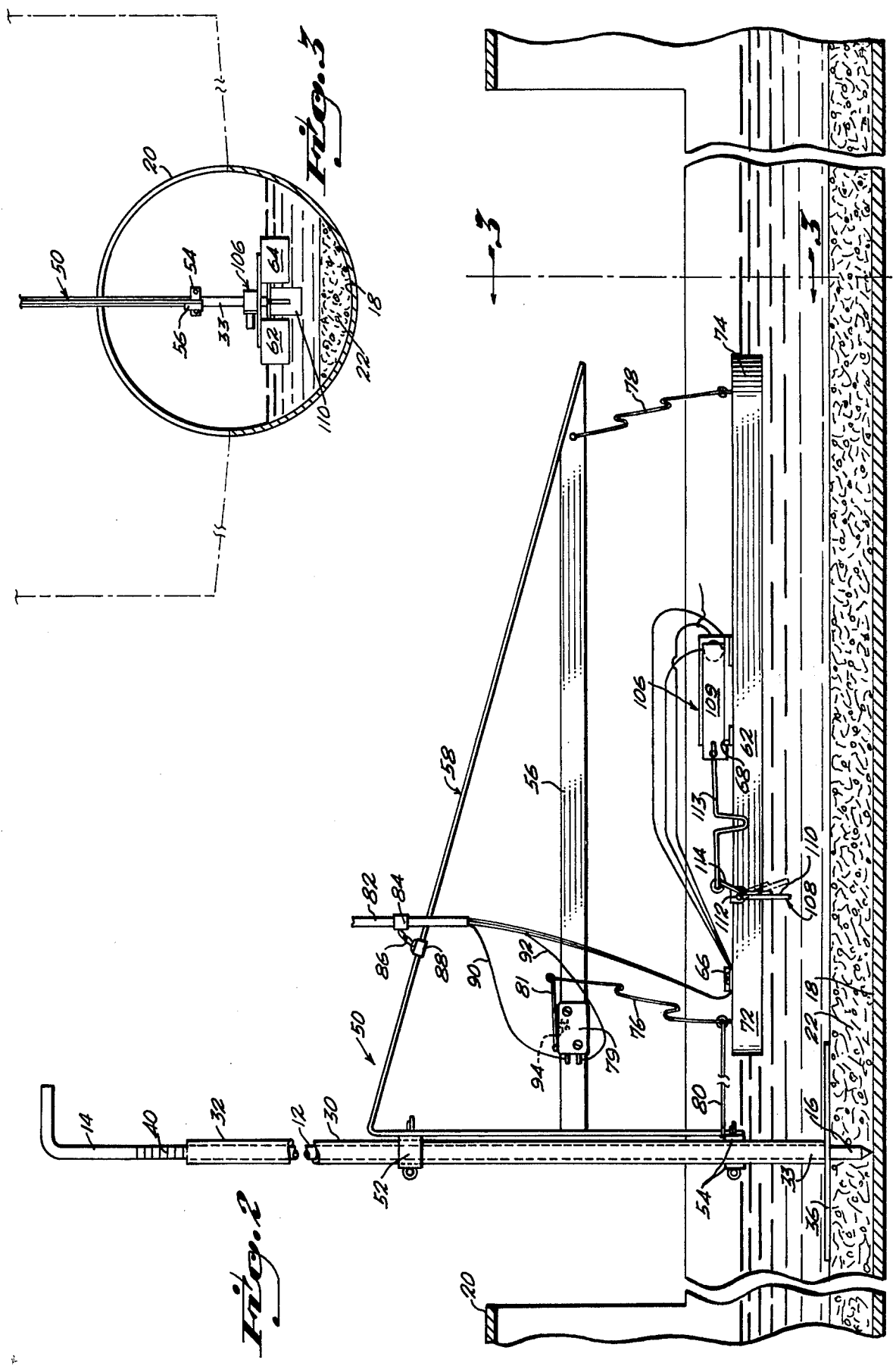

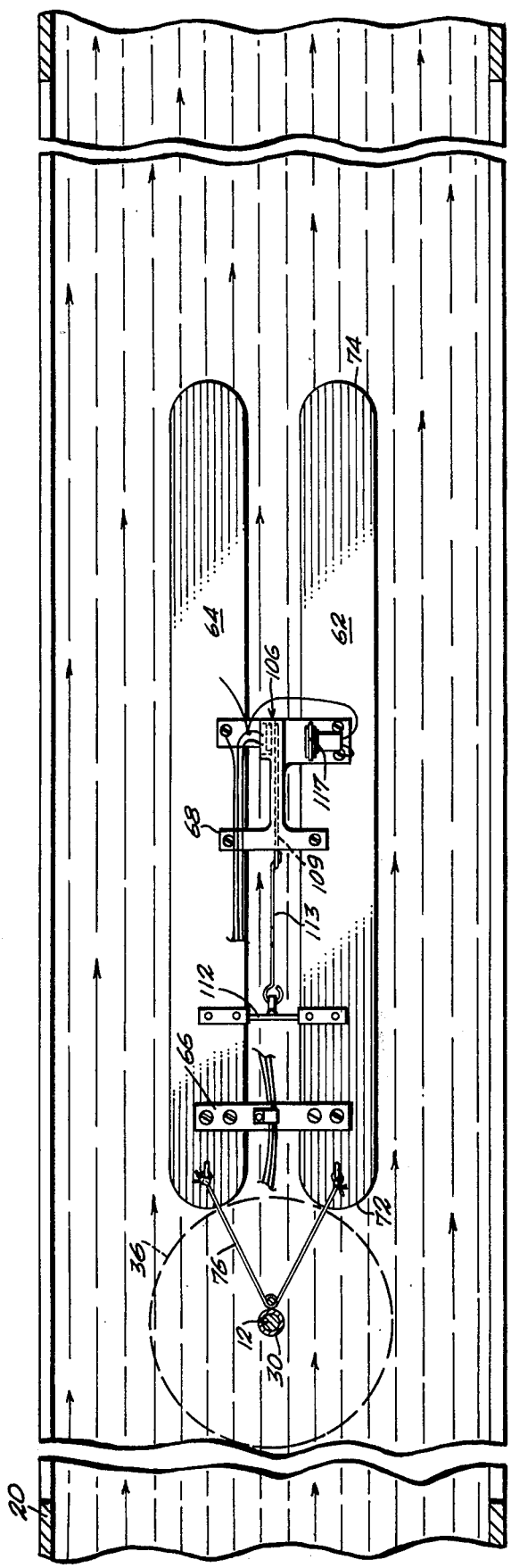
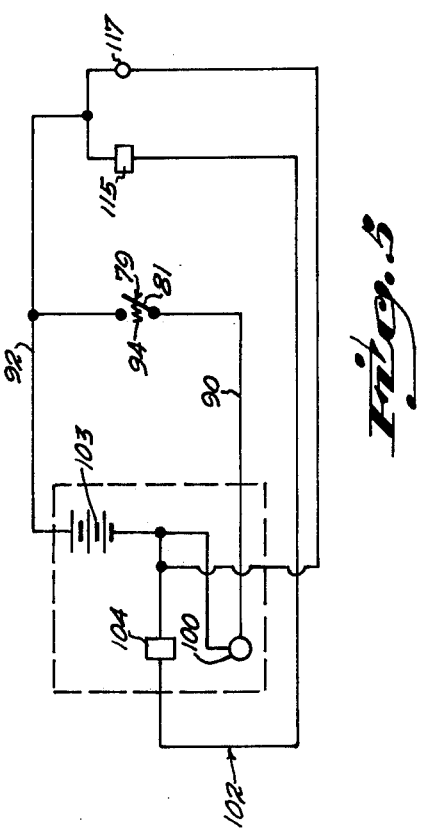

MEASURING DEVICE FOR WATER FLOW IN A BURIED PIPE

FIELD OF THE INVENTION

This invention relates to a measuring device to determine water flow rates through a submerged pipe.

BACKGROUND OF THE INVENTION

As is perhaps well known, in the past it has often been a problem to measure the condition of submerged pipes, namely, the amount of sediment in a pipe, the rate of flow in the pipe, and the depth of water flowing in the pipe.

This invention is of a device which has as an object (a) provision for measuring the depth of sediment on the floor of a generally horizontal sewer pipe accessible through a vertical shaft or manhole passageway and which is arranged below ground level and (b) the depth of water flow above the sediment in the pipe and (c) the rate of flow of the water in the pipe.

It is a general object of this invention to provide an improved measuring device for determining water flow rates in a submerged pipe which includes a first shaft with a sleeve movable with respect thereto so that the lower end of the shaft is adapted to be positioned on the floor of the pipe and the lower end of the sleeve is adapted by reason of axial displacement when it rests on a layer of sediment in the pipe to measure the depth of the sediment and a float tethered to the sleeve which floats on the water and is supported thereby and which includes a signal to indicate when the float is supported by the water instead of on suspension means which are provided to support the float when under the influence of gravity alone and which additionally, includes an apparatus for measuring the rate of flow of water past the float, whereby the information measured may be utilized in the manner set forth more fully hereinafter to measure the rate of flow of water through the pipe.

In accordance with these and other objects which will become apparent hereinafter, the instant invention will now be described with reference to the accompanying drawings, in which:

DESCRIPTION OF THE DRAWINGS:

FIG. 2 is a side elevation view of the measuring device;

FIG. 3 is a view in cross section taken on the plane indicated by the line 3—3 of FIG. 2 and looking in the direction of the arrow;

FIG. 4 is a top plan view of the device shown in FIG. 2; and

FIG. 5 is a circuit diagram illustrating the electrical portion of the instant invention;

Figure 1:
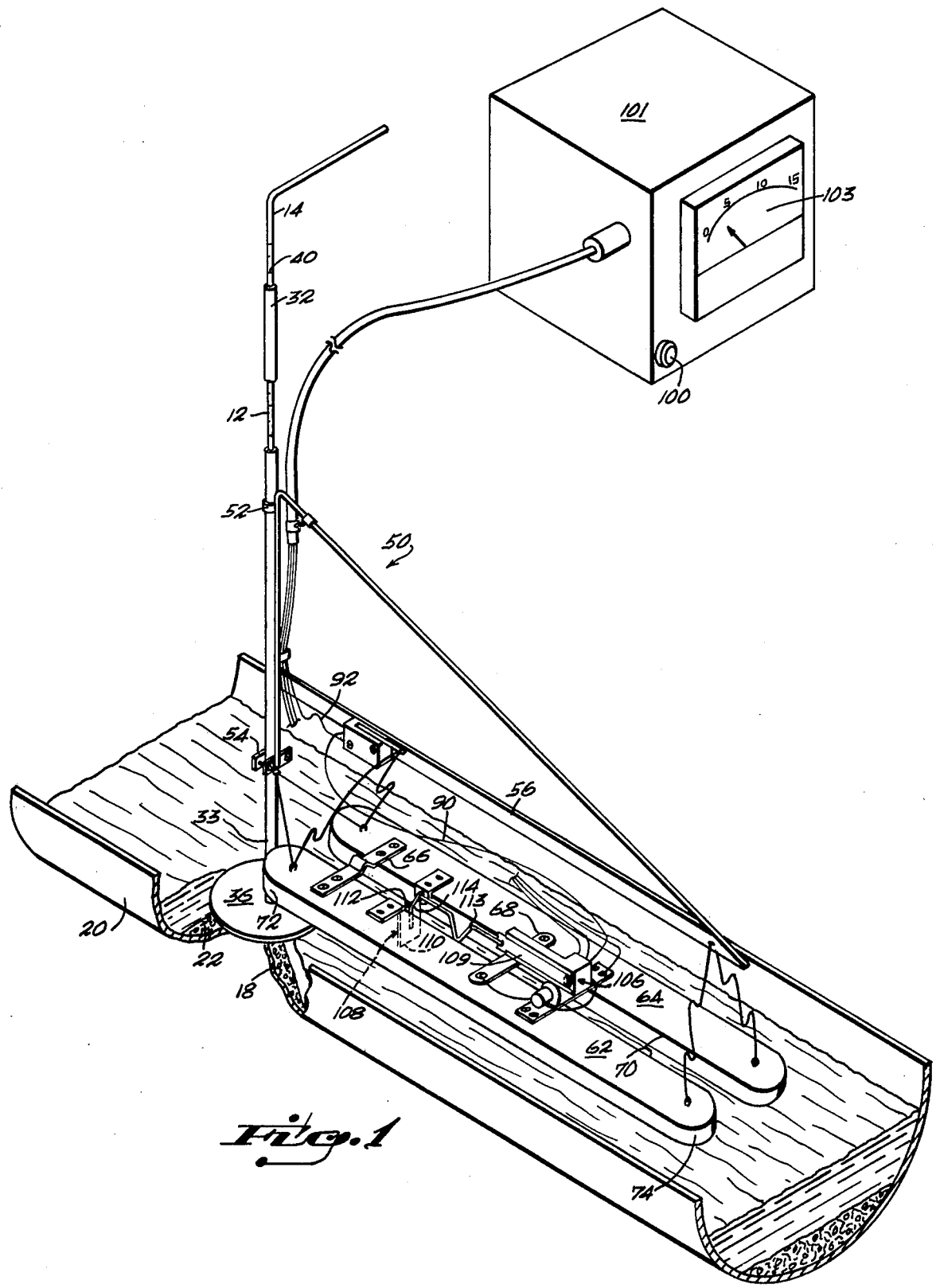
FIG. 1 is a perspective view of the device illustrating the use thereof.

DETAILED DESCRIPTION OF PREFERRED EMBODIMENT:

Referring to FIGS. 1 and 2, the device is seen to include a shaft 12 with an upper end 14 and a lower end 16 and of a length to reach from the upper end which is above ground level to the floor 18 of a buried pipe 20. The lower end 16 is preferably pointed, as shown, to pierce a sediment layer 22 which is usually to be found on the floor of such a buried pipe. It is adapted, therefore, to be forced through the sediment until the tip is in engagement with the pipe floor as shown in FIG. 2. An elongate sleeve 30 is telescoped over the shaft 12. The sleeve is of a length which is less than that of the shaft but, generally, similar to it. It has an upper end 32 and a lower end 33. To the lower end, a plate 36, preferably disc-shaped, is fixed in perpendicular relation to the shaft; and it is adapted to rest on the surface of sediment in the pipe. Means are provided to measure the axial displacement of the lower end of the shaft and the disc on the lower end of the sleeve which may be in the form of mutually intercooperating means on the upper end of the sleeve and upper end of the shaft. To this end calibrations, as at 40 on the upper end zone 14 of the shaft are provided which indicate the distance between the plate and the lower end of the shaft. This is seen as a measurement of the depth of sediment in the pipe. Structure, now to be described, is slidably captivated on the sleeve for vertical movement therealong, i.e., between the disc and toward the upper end of the sleeve. The structure is generally designated by the numeral 50; and it includes: (a) a slide means engaging the sleeve, which may be an upper ring and a lower pair of slide plates 52 and 54 in spaced relation from one another and in engagement with the sleeve, (b) a boom 56 extending laterally from the slide means on a frame 58 which includes the boom, and (c) a float means suspended by a flexible tether from the boom. The float means, which may comprise a first and a second elongate body 62 and 64, as shown, are suitably connected together by brackets 66 and 68 defining a space 70 between them. The float means is adapted to float on the water level in the pipe; and it includes a forward end zone 72 and a rearward end zone 74.

In the preferred embodiment shown, the flexible tether comprises a strand 76 connecting the boom to the float at its forward end zone 72 and a strand 78 connecting the boom 56 to the rearward end zone 74 of the float means. The two strands orient the float means, preferably in a generally horizontal attitude when the float is suspended and the strands are taut or under tension when supporting the weight of the float means.

In use, the shaft is inserted until the point 16 rests on the floor 18 of the pipe. Thereafter, the sleeve is moved downwardly in telescoped relation along the shaft until the surface of the plate or disc rests as shown in FIG. 2 on the surface of the sediment. The depth of the sediment may then be measured upon reference to the calibrations 40 on the upper end of the shaft. The slidable structure is then moved vertically with respect to the sleeve. As it is moved upwardly or downwardly the weight of the float means will exert tension on the strands or the tension on the strands will be reduced or slackened as the weight of the float means is taken up by the buoyancy effect as it engages the water. In a preferred embodiment the strands are such as to be free hanging when the float is supported by the water. The forward end 72 of the float is tethered to a line such as 80 which connects it to the slidable structure.

The sliding structure is raised and lowered by a tubular cable 82 which is connected at its lower end zone 84 by a connector 86 to the slidable structure, as at 88, which is, generally, at its center of gravity. It is thus seen that an upwardly directed force transmitted to the sliding structure through the cable will lift the float until it is in a suspended condition with the weight thereof carried by the strands 76 and 78 which are taut until such time as the float means is lowered and the weight of the float is taken up by the buoyant force of the water acting on the float means, at which time the lines 76 and 78 will slacken.

Signal means are included to sense a relaxation of tension in one of the strands, such as the forward strand 76 as the float means engages the water and becomes supported thereby. This signal means may comprise a switch 79 in a circuit and which switch includes a switch arm 81 normally spring-urged into a first position but yieldable when tension is removed from it, i.e., in the condition shown in FIG. 2, so that current will flow through the circuit indicated by the conductor lines 90 and 92 when the tension on the line 76 is relaxed. The spring means indicated by the numeral 194 urges the arm 81 of the switch 79 into the normally open position. Through the conductor lines 90 and 92, which pass through the tubular cable 82, a light 100 in FIG. 1 will be energized from a source, such as a battery, included in the housing 101. At the instant the light comes on, the cable is a measure of the depth of the water in the pipe and can be determined in relation to the length of the pipe and the depth of sediment in the bottom of the pipe.

Means are also provided to sense the rate of waterflow through the pipe. These means include a circuit 102 which includes a meter 104 electrically connected to a sensor 106. The sensor includes a member 108 movably supported by the float means and means constraining that movable member to a predetermined path of movement with a portion of the member 108 at all times extending below the normal waterline of the float means, which is indicated by the water pipe or rotation of the finned rotor.

It is thus seen that one utilizing the device and knowing the cross sectional area of the buried pipe may, with the measured information determined as set forth above, determine the cross sectional area of the water which is flowing and, additionally, the rate of its flow through the pipe. Thus, the condition of a pipe below the surface may be measured for maintenance and delivery rates which is important in measuring and planning sewerage and water delivery systems and a device has been provided whereby measurements may be taken through a manhole shaft or passageway of (a) the depth of sediment on the floor of a generally horizontal sewer pipe accessible through the passageway and below the ground level, (b) the depth of water flow above the sediment in the pipe, and (c) the rate of flow of the water in the pipe.

What is claimed is:

1. For insertion through a vertical passageway to measure (a) the depth of sediment on the floor of a generally horizontal sewer pipe accessible through the vertical shaft and below the ground level, and (b) the depth of waterflow above the sediment in the pipe, a device comprising:

a shaft with an upper end and a lower end and of an axial length to reach from above the ground level to the pipe floor, an elongate sleeve having a lower end and said sleeve being of an axial length less than the shaft length and having a portion with an upper end, said sleeve being telescoped over said shaft, the lower end of the sleeve including a radially extending surface to rest on the surface of sediment in the pipe, mutually cooperating means included on the upper end zone of the shaft and on the sleeve portion upper end to indicate the axial displacement of the lower end of the sleeve relative to the lower end of the shaft when said radially extending surface rests on the surface of sediment in the pipe, structure slidably captivated on the sleeve for axial movement along the sleeve above the radially extending surface, said structure including:
  a. a boom extending radially outwardly of said sleeve above the lower end of said sleeve,
  b. float means to float on water in the pipe, said float means having a forward zone and a rearward zone,
  c. means suspending the float means from the boom, said means suspending including a strand length under tension and supporting said float means when the weight of the float means is acted upon by gravity alone and said tension is reduced when the float means are supported by buoyancy forces exerted by water, and
  d. tether means connecting the forward zone of the float means to said structure;

means to raise and lower said structure; and means to sense tension changes in said means suspending including a signal means to signal when tension is reduced in said means suspending and including first circuit means comprising an energy source and said means to sense and said signal means.

2. The device as set forth in claim 1 wherein the means to raise and lower said structure includes a cable having a first end zone and a second end zone, and means are provided to connect the second end zone to the structure and said cable is of a length at least about as long as the shaft length.

3. The device as set forth in claim 2 wherein said cable is tubular and said circuit means includes electrical conductors extending longitudinally through the cable and said conductors have a first portion extending from the first end zone and said conductors have a second portion extending from the second end zone, said signal means and source being electrically connected in series with one another and to said portion of said conductors extending from said first end zone and said means to sense is electrically connected to said portion of said conductors extending from said second end zone.

4. The device as set forth in claim 3 wherein said signal means and said source are included in a housing.

5. The device as set forth in claim 3 wherein the means to sense includes a switch means and means fixing the switch means on the boom, said switch means having a spring-biased arm in a first normal position and movable to a second position, said means suspending being connected to the arm and maintaining said arm in the second position when under tension and, when the tension is reduced, said biasing causing the arm to move to the normal position.

6. The device as set forth in claim 5 wherein the signal means comprises a light.

7. The device as set forth in claim 1 wherein means are provided to measure the rate of flow of water past the float means when said float means is buoyant.

8. The device as set forth in claim 7 wherein the means to measure includes a member on the float means and means movably mounting the member to the float means and constraining the member to a predetermined path of movement, said member having a portion at all times extending beyond the normal waterline of the float means to be acted upon by water flowing past the float means, and means to sense the amount of movement of said member relative to said path.

9. The device as set forth in claim 8 wherein said means to sense comprises a meter.

* * * * *